(12) United States Patent
Yamagiwa

(10) Patent No.: US 6,868,881 B1
(45) Date of Patent: Mar. 22, 2005

(54) TIRE CONTAINING SEALER

(75) Inventor: Toshio Yamagiwa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/926,487

(22) PCT Filed: Apr. 18, 2000

(86) PCT No.: PCT/JP00/02522
§ 371 (c)(1),
(2), (4) Date: Jan. 25, 2002

(87) PCT Pub. No.: WO00/68029
PCT Pub. Date: Nov. 16, 2000

(30) Foreign Application Priority Data

May 10, 1999  (JP) ............................................. 11/128862

(51) Int. Cl.⁷ .............................. B60C 5/14; B60C 19/12
(52) U.S. Cl. ........................ 152/502; 152/503; 152/510
(58) Field of Search ................................. 152/501, 502, 152/503, 504, 505, 506, 507, 510

(56) References Cited

U.S. PATENT DOCUMENTS

| 3,048,509 A | * | 8/1962 | Sweet et al. ................. 428/189 |
| 3,903,947 A | * | 9/1975 | Emerson ...................... 152/504 |
| 4,057,090 A | * | 11/1977 | Hoshikawa et al. ......... 152/504 |
| 4,286,643 A | * | 9/1981 | Chemizard et al. .......... 152/505 |
| 4,539,076 A | * | 9/1985 | Swain ......................... 202/154 |
| 5,426,147 A | * | 6/1995 | Laube et al. ................. 524/495 |

FOREIGN PATENT DOCUMENTS

| EP | 0893236 | * | 1/1999 |
| JP | 61-146608 |   | 7/1986 |
| JP | 61229604 | * | 10/1986 |
| JP | 8-323875 |   | 12/1996 |

* cited by examiner

Primary Examiner—Blaine Copenheaver
Assistant Examiner—Justin Fischer
(74) Attorney, Agent, or Firm—Arent Fox, PLLC

(57) ABSTRACT

In a sealant-containing tire, an outer liner is fastened to an inner surface of a tread of a tire body, and a sealant chamber that is filled with sealant is defined between a central part of an inner linear and an inner surface of an outer liner by fastening left and right ends of an inner linear to an inner surface of a side wall of a tire body. The tire body comprises a mixture of butyl rubber and natural rubber, or a mixture of butyl rubber and acrylonitrile butadiene rubber, the outer liner comprises natural rubber, and the inner liner comprises butyl rubber. The sealant chamber can therefore be reliably formed without the outer liner and the inner liner becoming fastened together during vulcanization molding without employing an anti-sticking agent or an anti-sticking sheet.

2 Claims, 9 Drawing Sheets

TIRE CONTAINING SEALER

FIELD OF THE INVENTION

The present invention relates to a sealant-containing tire having an annular sealant chamber defined by a liner at an inner surface of a tread of a tire body.

BACKGROUND ART

Sealant-containing tires such as disclosed in Japanese Patent Application Laid-open No. 8-323875, where a sealant chamber at least partially defined by a liner is formed at an inner surface of a tread of a tire body so that punctures in the tread caused by nails etc. are automatically sealed by sealant contained within the sealant chamber so as to delay the leaking of air from the puncture, are well known.

With this related sealant-containing tire, when the liner is overlaid on the tire body prior to vulcanization molding, vulcanization molding is carried out with part of the contact surfaces of both the tire body and the liner, or parts of contact surfaces of liners, being applied with an anti-sticking agent such as talcum powder etc. When the tire body is then fastened through vulcanization to the tire body so as to form a single body, a sealant chamber is formed as a result of portions to which the anti-sticking agent has been applied remaining in an unfastened state. Other methods where, rather than using the anti-sticking agent, an anti-sticking sheet is sandwiched between the tire body and part of the liner contact surface or is sandwiched between parts of the contact surfaces of liners, are also well known.

However, applying an anti-sticking agent or sandwiching an anti-sticking sheet when overlaying a liner on a tire body prior to vulcanization molding in the tire manufacturing process causes both the number of processes and the cost to increase, and it would therefore be preferable to develop a sealant containing tire where a sealant chamber can be formed without using an anti-sticking agent or anti-sticking sheet.

DISCLOSURE OF THE INVENTION

In order to resolve the aforementioned problems, it is therefore the object of the present invention to accurately form a sealant chamber of a sealant-containing tire without employing an anti-sticking agent or anti-sticking sheet.

In order to achieve the aforementioned object, according to the present invention, a sealant-containing tire with an annular sealant chamber formed at an inner surface of a tread of a tire body, and with the inside of the sealant chamber being filled with sealant, the sealant-containing tire comprises an outer liner fastened to the inner surface of the tread of the tire body, and an inner liner with left and right ends fastened to the inner surface of a side wall of the tire body so that a sealant chamber is defined between a central part of the inner liner and the inner surface of the outer liner. Here, the outer liner and the inner liner are composed of materials having anti-sticking properties.

According to the above configuration, a sealant chamber can be reliably formed without using an anti-sticking agent or anti-sticking sheet so that both the number of steps and costs are reduced because a sealant chamber is defined between the central part of an inner liner and an inner surface of an outer liner by fastening the outer liner to the inner surface of the tread of the tire body and fastening the left and right ends of the inner liner to the inner surface of the side wall of the tire body and because the outer wall liner and the inner wall liner are composed of materials having anti-sticking properties.

In addition to the above configuration, there is proposed a sealant-containing tire where the tire body comprises a mixture of at least butyl rubber and natural rubber, or at least butyl rubber and acrylonitrile-butadiene rubber, with the outer liner being formed mainly of natural rubber, and the inner liner being composed mainly of butyl rubber.

According to this configuration, adhesiveness between the inner liner and the tire body, and between the outer liner and the tire body can be maintained while having anti-sticking properties between the outer liner and the inner liner because the tire body comprises a mixture of at least butyl rubber and natural rubber, or at least butyl rubber and acrylonitrile-butadiene rubber, with the outer liner being formed mainly of natural rubber, and the inner liner being composed mainly of butyl rubber.

According to the present invention, there is proposed a sealant-containing tire with an annular sealant chamber formed at an inner surface of a tread of a tire body, and with the inside of the sealant chamber being filled with sealant, the sealant-containing tire comprising an outer liner fastened to the inner surface of a side wall of the tire body, and an inner liner with left and right ends fastened to the inner surface of the outer liner so that a sealant chamber is defined between a central part of the inner liner and the inner surface of the side wall. Here, the inner liner and the tire body are composed of materials having anti-sticking properties.

According to the above configuration, a sealant chamber can be reliably formed without using an anti-sticking agent or anti-sticking sheet so that both the number of steps and costs are reduced because a sealant chamber is defined between the central part of the inner liner and the inner surface of the tread of the tire body by fastening the outer liner to the inner surface of the side walls of the tire body and fastening the left and right ends of the inner liner to the inner surface of the outer liner and because the inner liner and tire body are composed of material having anti-sticking properties.

According to the present invention, there is proposed a sealant-containing tire with an annular sealant chamber formed at an inner surface of a tread of a tire body, and with the inside of the sealant chamber being filled with sealant, the sealant-containing tire comprising a first outer liner, fastened to the inner surface of the tread of the tire body, a second outer liner fastened to the inner surface of a side wall of the tire body, and an inner liner with left and right ends fastened to the inner surface of the second outer liner so that a sealant chamber is defined between a central part of the inner liner and the inner surface of the first outer liner. Here, the first outer liner and the inner liner are composed of materials having anti-sticking properties.

According to the above configuration, a sealant chamber can be reliably formed without using an anti-sticking agent or anti-sticking sheet so that both the number of steps and costs are reduced because a sealant chamber is defined between the central part of the inner liner and the inner surface of the first outer liner by fastening the first outer liner and the second outer liner to the inner surface of a tread and the side walls of a tire body, respectively, and fastening left and right ends of the inner liner to the inner surface of the second outer liner, and because the first outer liner and the inner liner are composed of materials having anti-sticking properties.

BRIEF DESCRIPTION OF THE DRAWINGS

FIG. 1 is a lateral cross-section of a wheel mounted with a tire, FIG. 2 is a view (first of two) of a process for manufacturing a tire, FIG. 3 is a view (second of two) of a process for manufacturing a tire, FIG. 4 is an enlarged cross-section along line 4—4 of FIG. 2, and FIG. 5 is an enlarged cross-section along line 5—5 of FIG. 3.

BEST MODE FOR CARRYING OUT THE INVENTION

The following is a description of practical examples of the present invention based on embodiments of the present invention shown in the appended drawings.

FIG. 1 to FIG. 5 show a first embodiment of the present invention.

Figure 1:
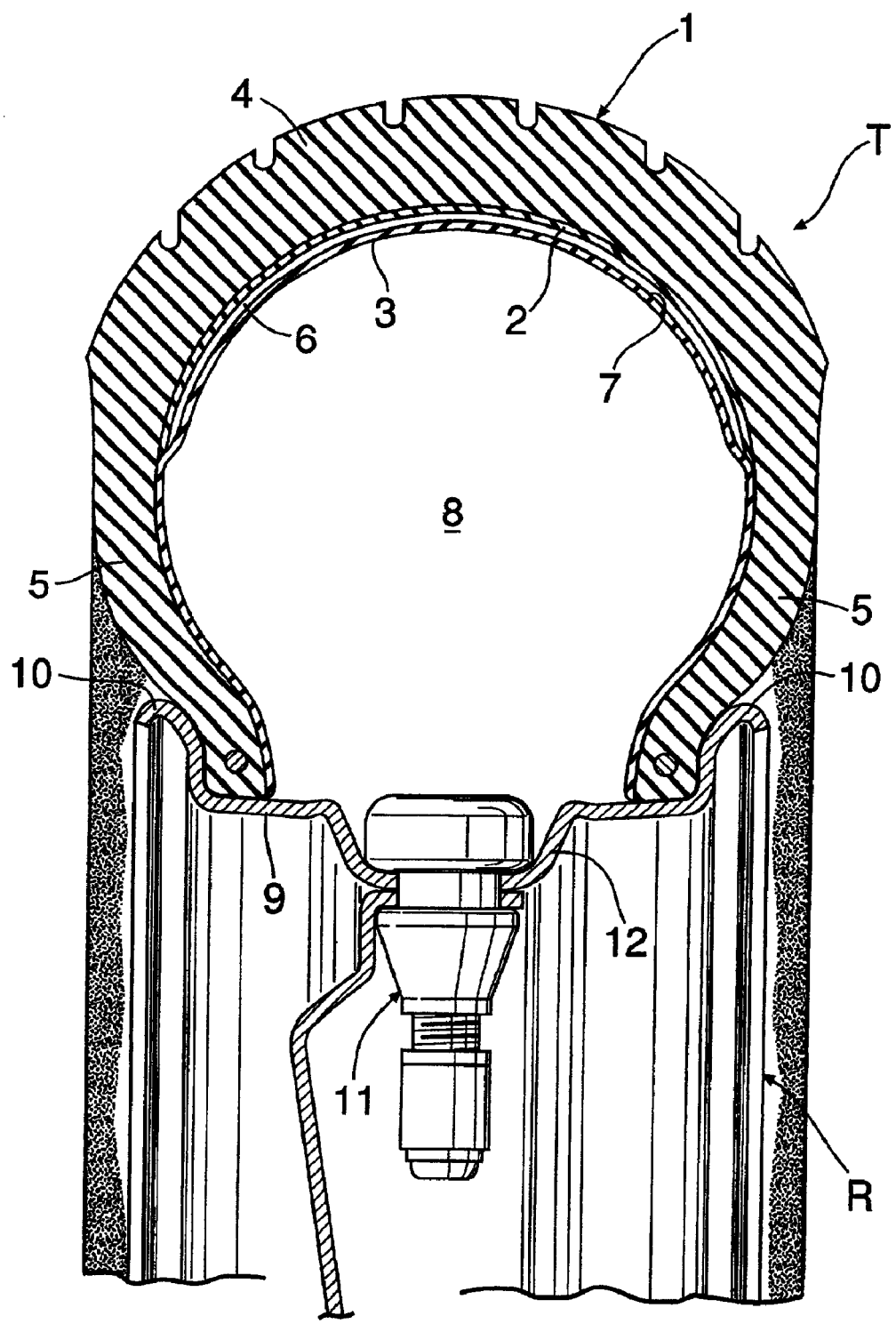
FIG. 1 to FIG. 5 show a first embodiment of the present invention, where

As shown in FIG. 1, a tubeless tire T comprising a tire body 1, an outer liner 2 fastened by vulcanization to the inner part of the tire body 1, and an inner liner 3 is mounted on a motorcycle wheel rim R. The outer liner 2 is fastened by vulcanization to the inner surface of a tread 4 of the tire body 1 and the left and right ends of the inner liner 3 excluding the central part are fastened by vulcanization to the inner surfaces of left and right side walls 5, 5 of the tire body 1. A sealant chamber 7 substantially arc-shaped in cross-section that is filled with sealant 6 is defined between the central part of the inner liner 3 and the outer liner 2 and an air chamber 8 substantially circular in cross-section is defined within the inner liner 3.

The rim R is equipped with an annular rim body 9 extending in a circumferential direction of the tire T, and a pair of flanges 10, 10, extending radially outwards in a widthwise direction from both ends of the rim body 9, for supporting the inner periphery of the tire body 1. An air valve 11 for filling the air chamber 8 with air is supported so as to pass through an air valve attachment section 12 formed at one location in the circumferential direction of the rim body 9.

The sealant chamber 7 is held in shape along the inner surface of the tread 4 by the air pressure of the air chamber 8. Therefore, even if the tire body 1 is punctured in a radial direction or from the side by a nail, etc., the sealant 6 immediately fills the puncture so as to repair the puncture, and the leaking of air from the air chamber 8 is delayed. The sealant 6 is also supported by the sealant chamber 7 and therefore does not flow to the air chamber 8, and the air valve 11 and pressure gauges etc. assigned to the air valve 11 do not become clogged.

The tire body 1 comprises a mixture including at least butyl rubber (IIR) and natural rubber (NR), or a mixture including at least butyl rubber (IIR) and acrylonitrile butadiene rubber (NBR), with carcass fiber then being embedded within these mixtures. The outer liner 2 is formed mainly of natural rubber (NR) and the inner liner 3 is formed mainly of butyl rubber (IIR). The tire body 1 therefore has adhesiveness with respect to both the outer liner 2 and the inner liner 3 but the outer liner 2 and the inner liner 3 both have anti-sticking properties with respect to each other, and are therefore difficult to attach to each other through vulcanization.

Figure 2:
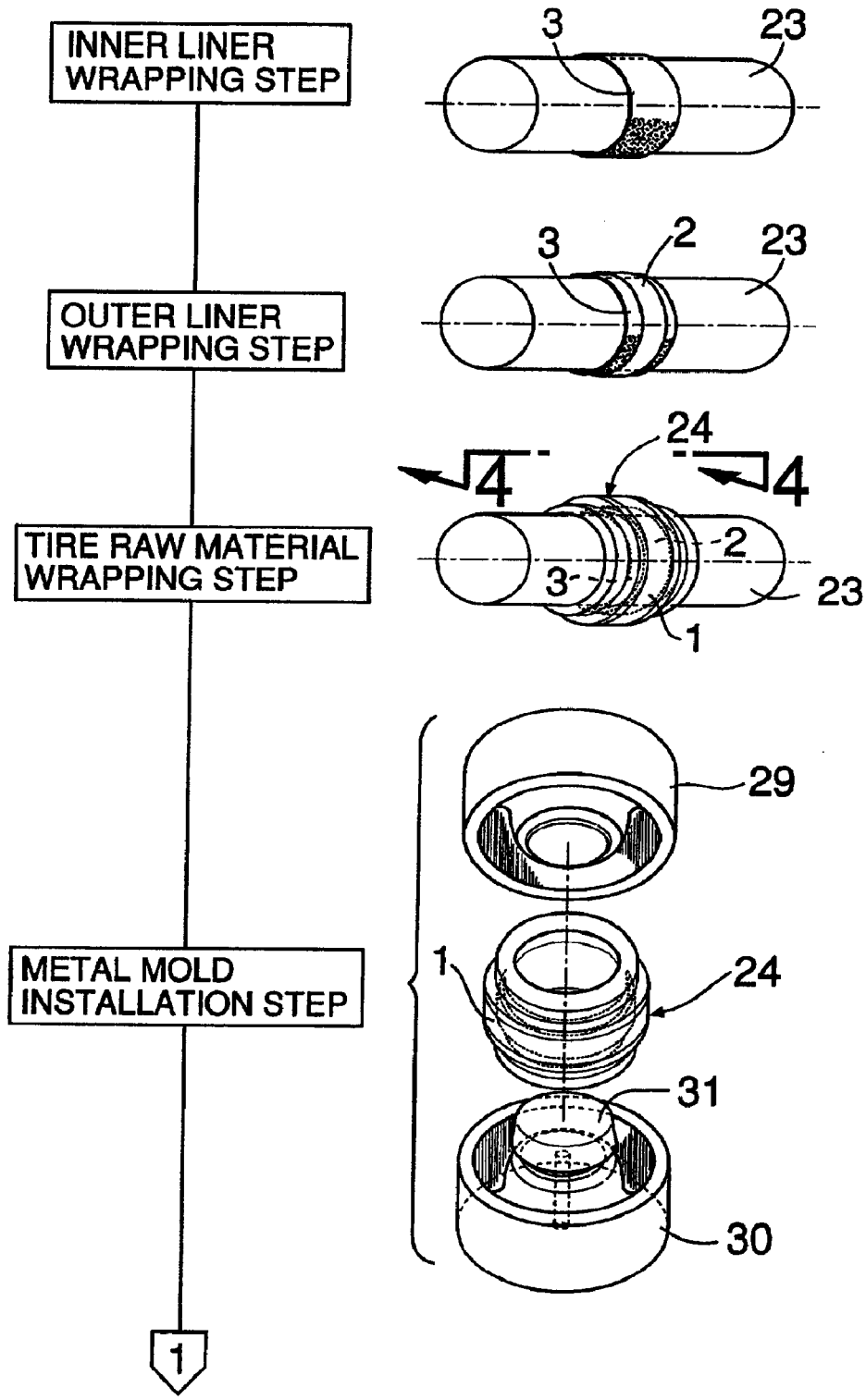
Figure 3:
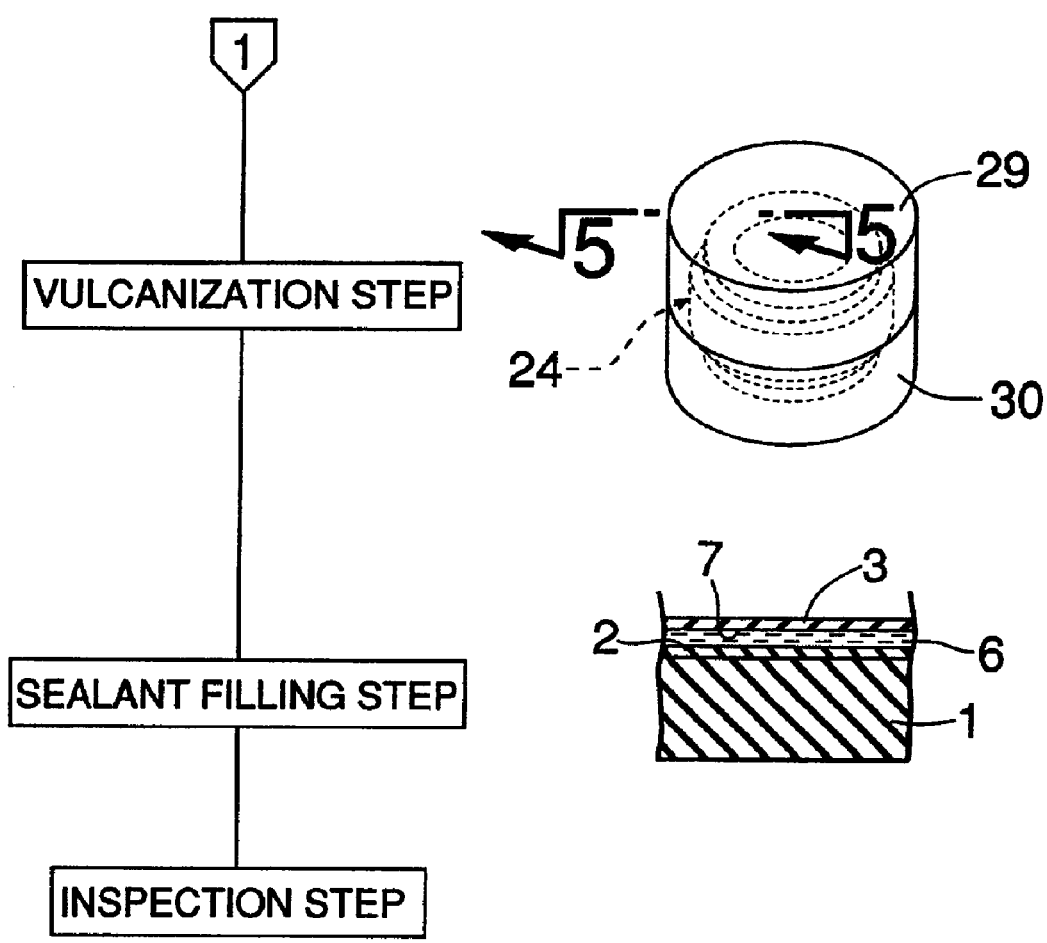

Next, a description is given of the process for manufacturing the tire T based on FIG. 2 and FIG. 3.

The process for manufacturing the tire T comprises an inner liner wrapping step, an outer liner wrapping step, a tire raw material wrapping step, a metal mold installation step, a vulcanization step, a sealant filling step, and an inspection step.

First, in the inner liner wrapping step, the cylindrical inner liner 3 is fitted to the outer periphery of a drum 23, and in the outer liner wrapping step, the outer liner 2 is wrapped around so as to be laid over the outer periphery of the inner liner 3. The tire raw material 24 is then formed by wrapping raw materials for each part of the tire body 1 about the outer periphery of the inner liner 3 and the outer liner 2 in the tire raw material wrapping step.

Figure 4:
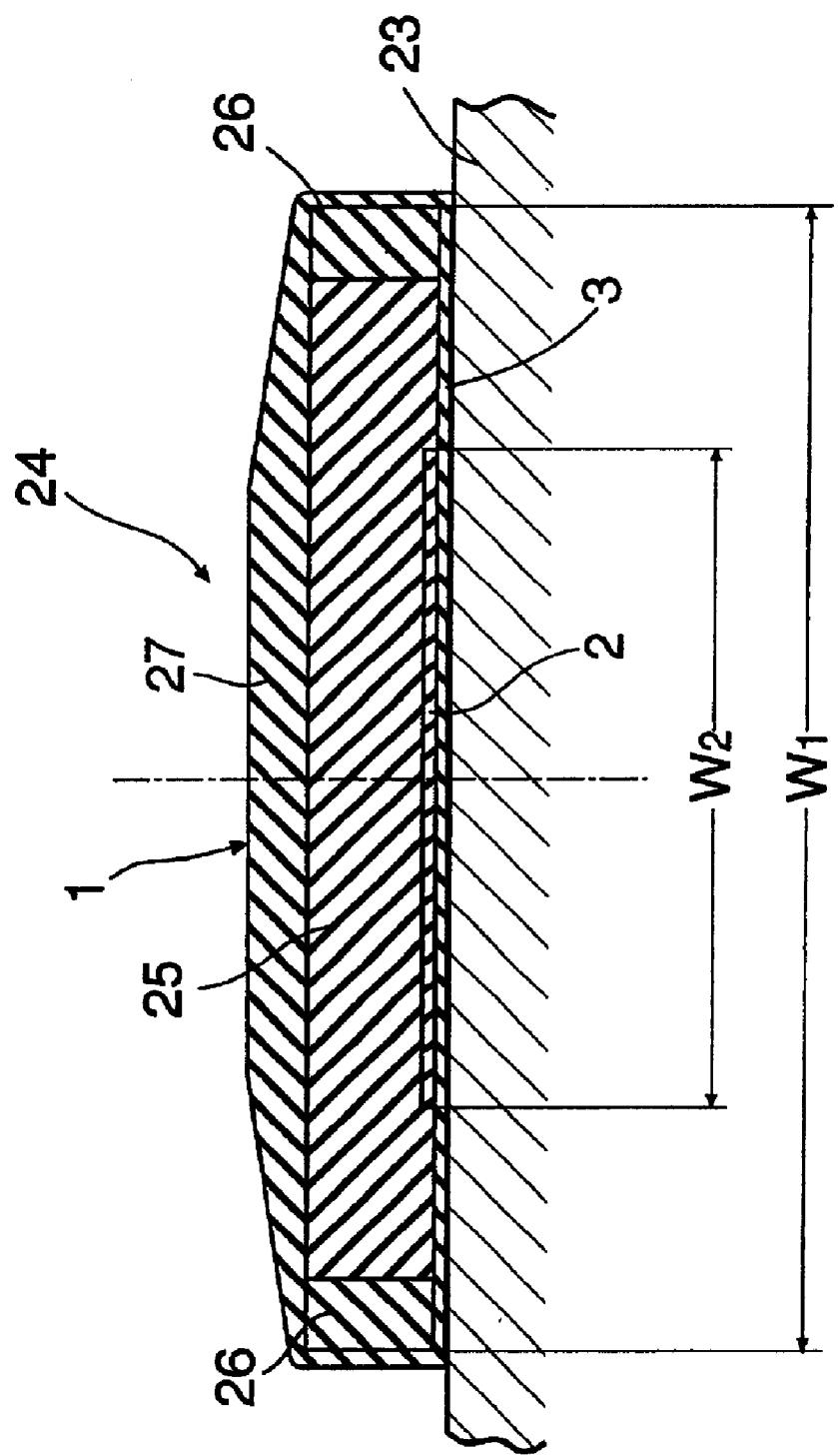
Figure 5:
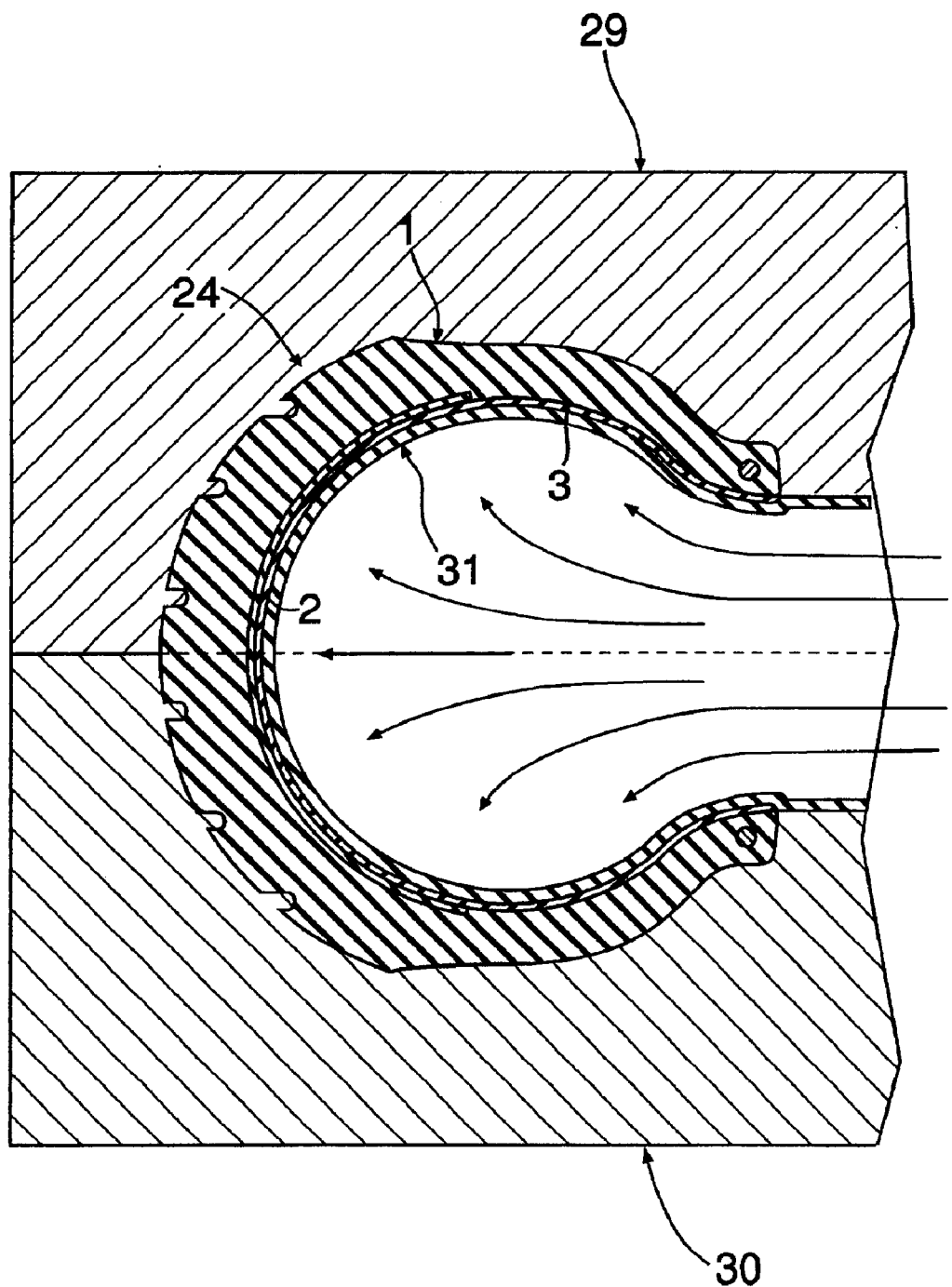

FIG. 4 shows a lateral cross-section of tire raw material 24 wrapped around the drum 23. Here, the width $W_2$ of the outer liner 2 overlaid on the outer side of the innermost positioned inner liner 3 of width $W_1$ is small, and part of the inner liner 3 therefore projects from the left and right ends of the outer liner 2.

The tire raw material 24 is constructed by wrapping the tire body 1 comprising raw rubber about the outer periphery of the inner liner 3 and the outer liner 2. The tire body 1 comprises a cord section 25 wrapped around the outside of the inner liner 3 and the outer liner 2 in a radial direction, a pair of bead sections 26, 26 fitted around the outer periphery of the inner liner 3 so as to continue on from both ends of the cord section 25 in an axial direction, and a top tread 27 wrapped around the outside of the cord section 25 and the bead sections 26, 26 so as to cover the cord section 25 and the bead sections 26, 26 in a radial direction.

The tire raw material 24 removed from the drum 23 is then installed between an upper mold 29 and a lower mold 30 for vulcanization molding in the metal mold installation step. In the vulcanization step shown in FIG. 5, the upper mold 29 and lower mold 30 are heated, a blazer 31 located within the tire raw material 24 is expanded using hot air, the tire raw material 24 is made to fit tightly with the molding surfaces of the upper mold 29 and the lower mold 30, and vulcanization molding is then performed to give the shape of the finished product. In this vulcanization molding, the inner liner 3 and the outer liner 2 are fastened by vulcanization to the tire body 1 so as to give a single body.

At this time, the tread 4 of the tire body 1 comprised of a mixture of butyl rubber (IIR) and natural rubber (NR), or a mixture of butyl rubber (IIR) and acrylonitrile butadiene rubber (NBR) is fastened by vulcanization to the outer liner 2 comprised of natural rubber (NR), and the side walls 5,5 of the tire body 1 are fastened by vulcanization to the inner liner 3 comprised of butyl rubber (IIR). However, the outer liner 2 formed of natural rubber (NR) and the inner liner 3 formed of butyl rubber (IIR) have anti-sticking properties with respect to each other and therefore do not become fastened through vulcanization. This means that the sealant chamber 7 can be defined between the outer liner 2 and the inner liner 3. Further, unevenness exists at the inner surface of the tread 4 of the tire body 1 embedded with carcass fiber but the fluidity of the sealant 6 can be increased and the sealing effect improved by removing this unevenness by fastening the outer liner 2.

A sealant chamber 7 of a precise shape can therefore be formed without employing an anti-sticking agent or anti-sticking sheet by suitably selecting the properties of the rubber of the tire body 1, the outer liner 2 and the inner liner 3, and the number of steps and the cost can be reduced accordingly.

When the vulcanization molding is complete and the outer liner 2 and the inner liner 3 that are now integrally formed with the tire body 1 are taken out of the metal mold, the inside of the sealant chamber 7 is filled with the sealant 6 using a syringe, etc. in the sealant filled step so that the tire T is completed. The completed product is then inspected in an inspection step so as to complete all of the steps.

Figure 6:
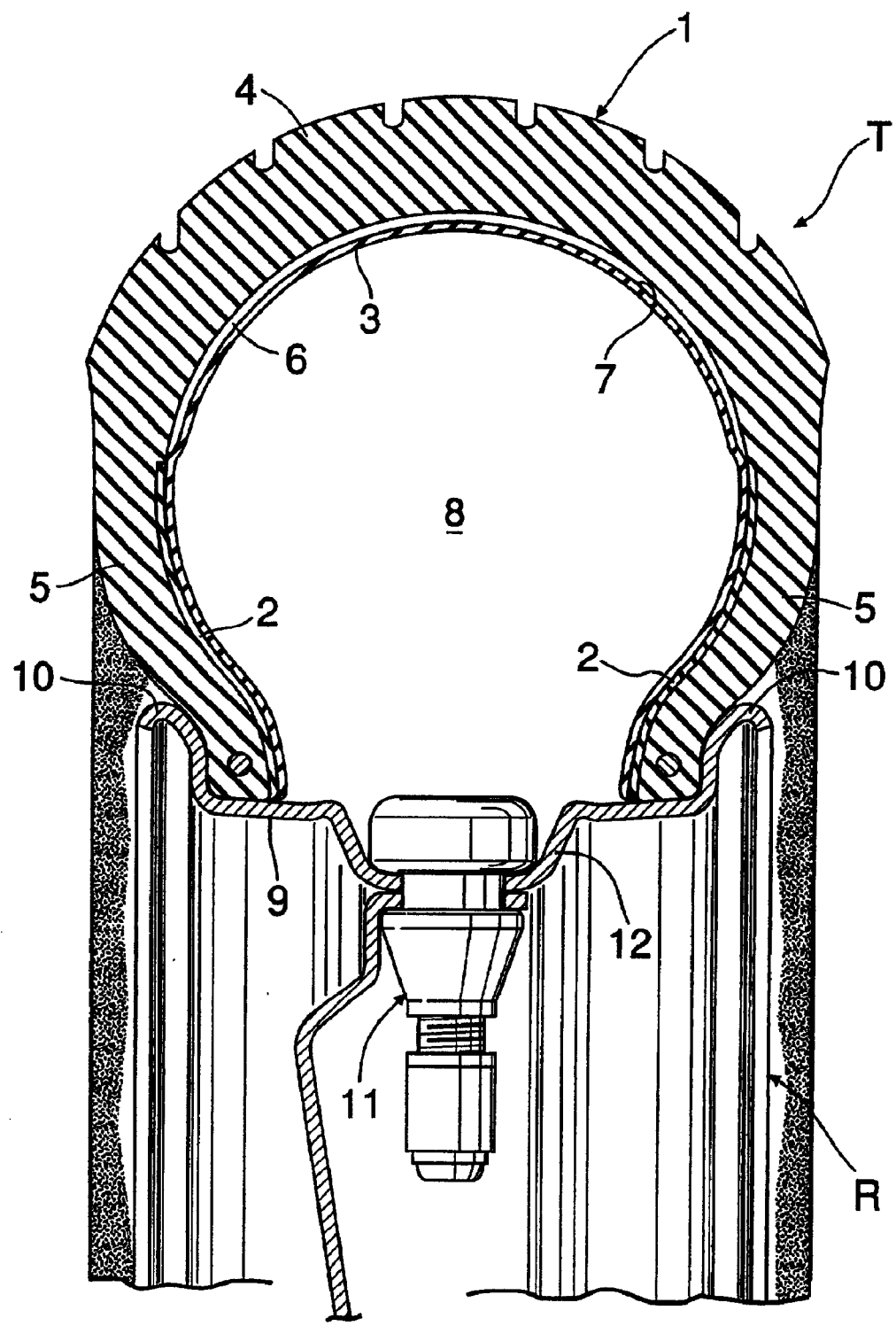
FIG. 6 is a lateral cross-section of a wheel mounted with a tire relating to a second embodiment of the present invention.
Figure 7:
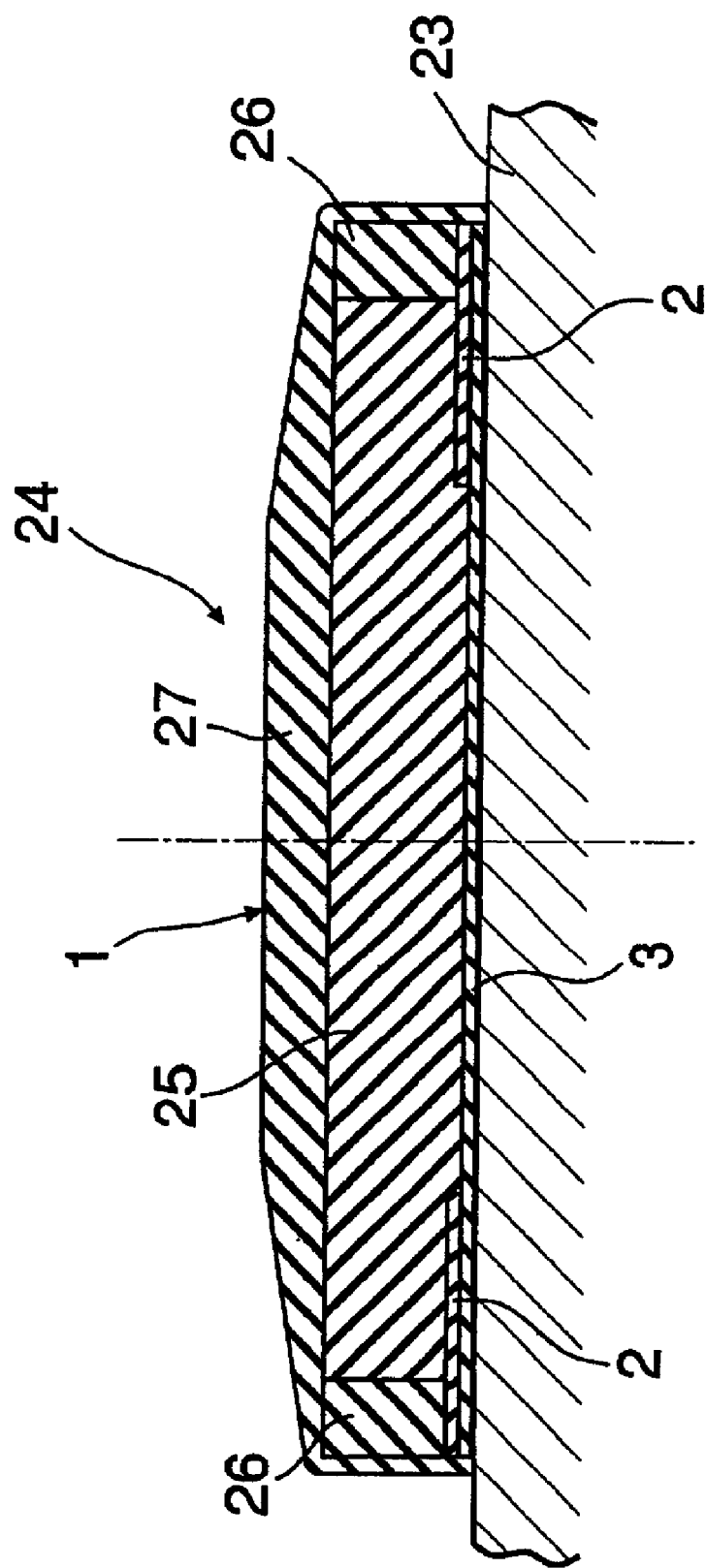
FIG. 7 is a view corresponding to FIG. 4, relating to a second embodiment of the present invention.

The following is a description based on FIG. 6 and FIG. 7 of a second embodiment of the present invention.

The second embodiment of the tire T differs from the first embodiment with regards to the positioning of fastening outer liners 2, 2 to the tire body 1, i.e. in the first embodiment, an outer liner 2 is fastened to the inner surface of the tread 4 of the tire body 1 but in the second embodiment, outer liners 2, 2 are fastened to the inner surfaces of left and right side walls 5, 5 of the tire body 1. The sealant chamber 7 is then defined between the inner surface of the tread 4 of the tire body 1 and the central part of the inner liner 3 by fastening the left and right ends of the inner liner 3 to the inner surfaces of the left and right outer liners 2, 2.

The outer liners 2, 2 are composed of rubber that is adhesive with respect to both the tire body 1 and the inner liner 3, and the inner liner 3 is composed of rubber that is adhesive with respect to the outer liners 2, 2 but has anti-sticking properties with respect to the tire body 1.

In order to manufacture the tire T having the aforementioned structure, in a tire raw material wrapping step shown in FIG. 7, after the inner liner 3 is wrapped around the outer periphery of the drum 23, the pair of outer liners 2, 2 are wrapped around the left and right ends of the inner liner 3. The tire body 1 comprised of raw rubber is then wrapped around the outer periphery so as to form the tire raw material 24, this tire raw material 24 is installed in a metal mold, and vulcanization molding is carried out. As a result, the outer liners 2, 2 become fastened by vulcanization to the inner surfaces of the side walls 5, 5 of the tire body 1, the left and right ends of the inner liner 3 become fastened by vulcanization to the inner surface of the outer liners 2, 2 but the tread 4 of the tire body 1 and the central part of the inner liner 3 do not become fastened together. A sealant chamber 7 can therefore be defined between the tread 4 and the inner liner 3 without employing an anti-sticking agent or a anti-sticking sheet.

Figure 8:
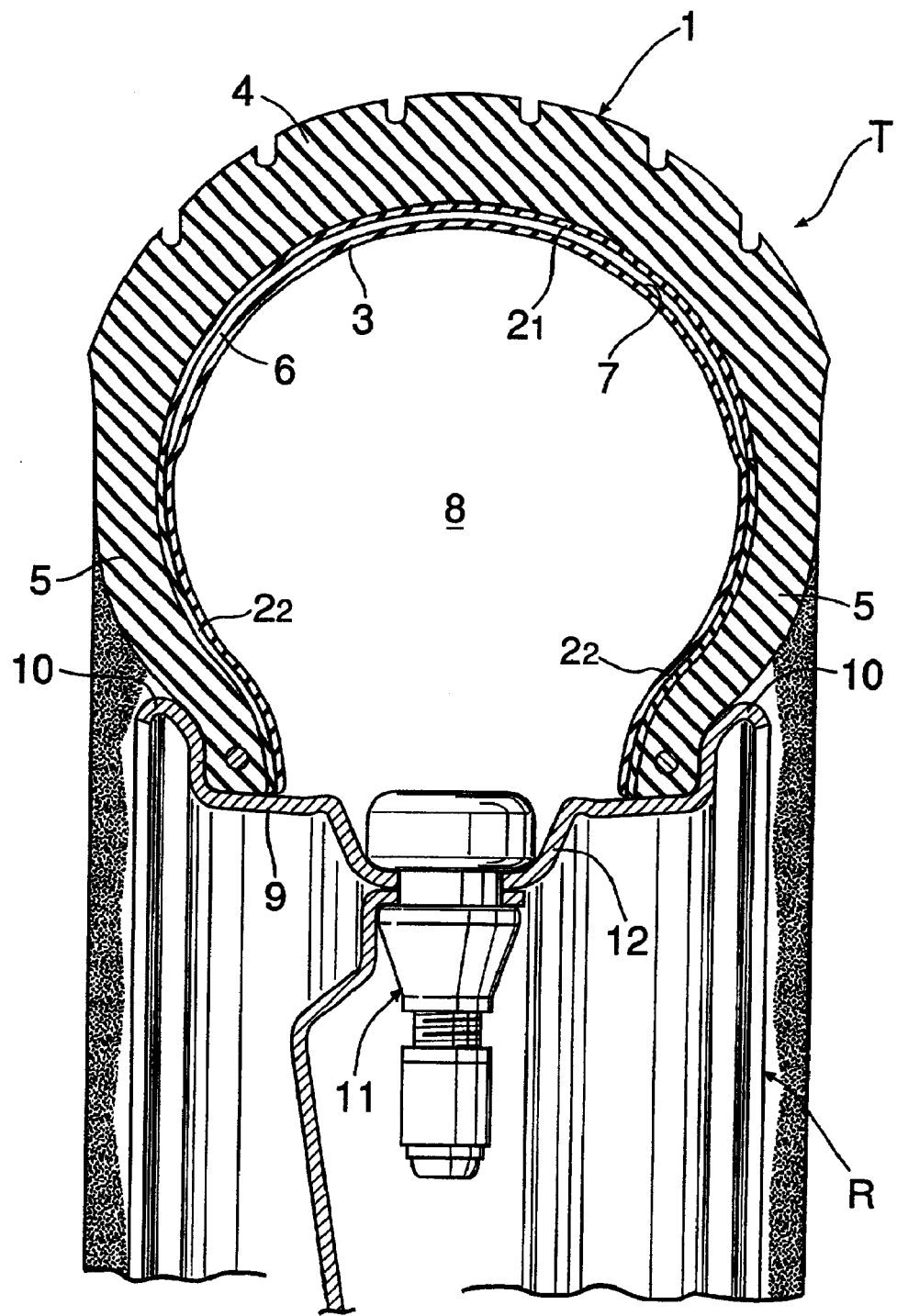
FIG. 8 is a lateral cross-section of a wheel mounted with a tire relating to a third embodiment of the present invention.
Figure 9:
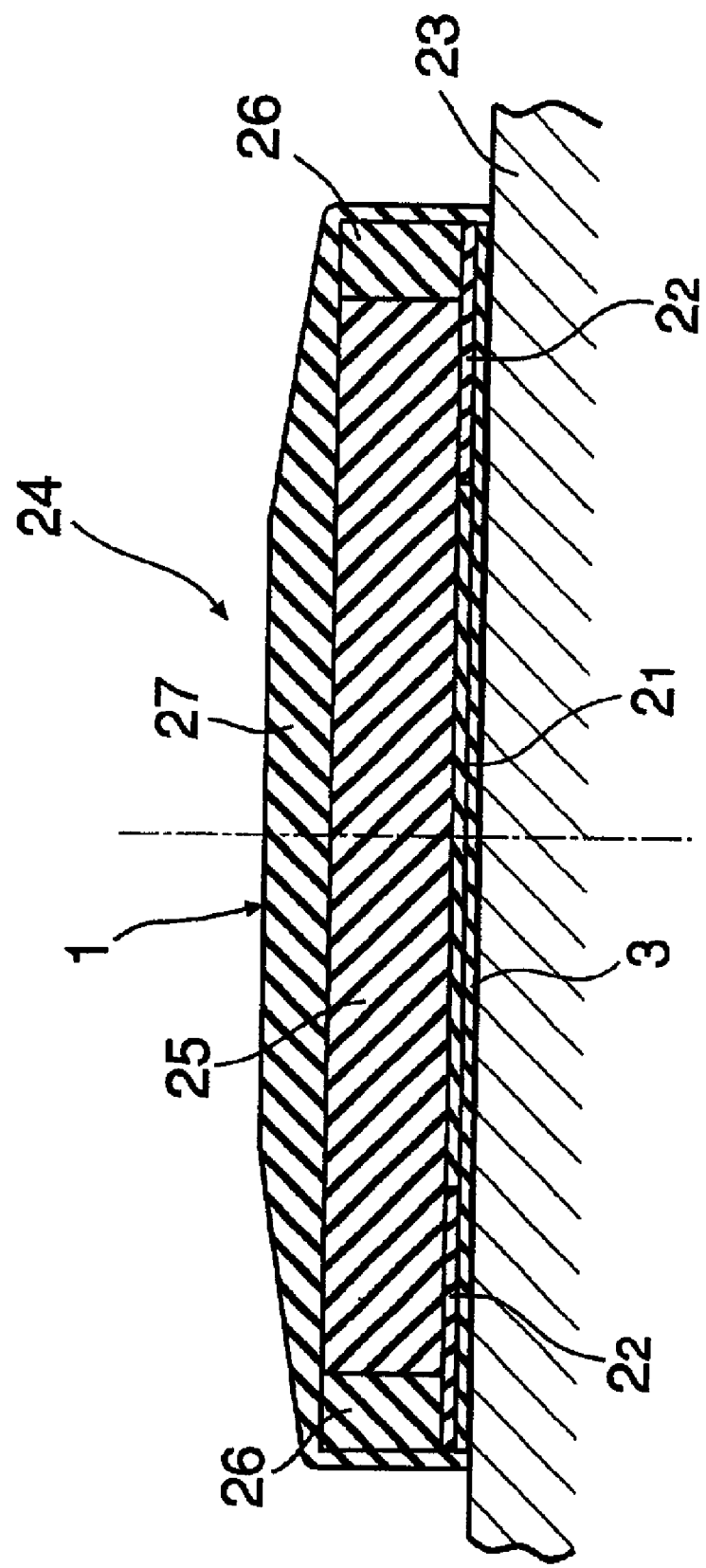
FIG. 9 is a view corresponding to FIG. 4, relating to a third embodiment of the present invention.

The following is a description of a third embodiment of the present invention based on FIG. 8 and FIG. 9.

The third embodiment of the tire T differs from the first embodiment and the second embodiment in that this third embodiment of a tire T is equipped with a first outer liner $2_1$ and second outer liners $2_2, 2_2$, i.e. in the third embodiment, the first outer liner $2_1$ is fastened to the inner surface of the tread 4 of the tire body 1, the second outer liners $2_2, 2_2$ are fastened to the inner surfaces of the left and right side walls 5, 5 of the tire body 1, and the left and right ends of the inner liner 3 are fastened to the inner surfaces of the second outer liners $2_2, 2_2$. The sealant chamber 7 can therefore be defined between the inner surface of the first outer liner $2_1$ and the central part of the inner liner 3.

The first outer liner 2, is formed of a rubber that is adhesive with respect to the tire body 1 but has anti-sticking properties with respect to the inner liner 3. The second outer liners $2_2, 2_2$ are formed of rubber having adhesiveness with respect to both the tire body 1 and the inner liner 3. The inner liner 3 is formed of a rubber having anti-sticking properties with respect to the first outer liner 2, but is adhesive with respect to the second outer liners $2_2, 2_2$.

In order to manufacture the tire T of the above structure, in the tire raw material wrapping step shown in FIG. 9, after the inner liner 3 is wrapped around the outer periphery of the drum 23, one first outer liner $2_2$ and two second outer liners $2_2, 2_2$ are wrapped around the central part of the central part, and left and right ends respectively, of the inner liner 3. The tire body 1 comprising raw rubber is then wrapped around the outer periphery so as to form the tire raw material 24, the tire raw material 24 is installed in the metal mold, and vulcanization molding is carried out. As a result, the first outer liner $2_1$ is fastened by vulcanization to the inner surface of the tread 4 of the tire body 1, the second outer liners $2_2, 2_2$ are fastened by vulcanization to the inner surfaces of the side walls 5, 5, the left and right ends of the inner liner 3 are fastened by vulcanization to the inner surfaces of the second outer liners $2_2, 2_2$ and the first outer liner $2_1$ and the central part of the inner liner 3 remain unfastened. The sealant chamber 7 can therefore be defined between the first outer liner $2_1$ and the inner liner 3 without employing an anti-sticking agent or an anti-sticking sheet.

Embodiments of the present invention are described above but various design modifications are possible without deviating from the spirit of the present invention.

INDUSTRIAL APPLICABILITY

As is apparent from the above, the sealant-containing tire according to the present invention is applicable to a two-wheeled motor vehicle and further to other types of vehicles, e.g., a bus, a truck or an automobile.

What is claimed is:

1. A sealant-containing tire with an annular sealant chamber formed at an inner surface of a tread of a tire body, and with the inside of the sealant chamber being filled with sealant, wherein said sealant-containing tire comprises:

an outer liner directly fastened to the inner surface of a side wall of the tire body; and an inner liner with left and right ends directly fastened to the inner surface of the outer liner so that a sealant chamber is defined between a central part of the inner liner and the inner surface of the tread, said sealant chamber containing the sealant, which sealant directly contacts the tread, wherein the inner liner and the tire body are composed of materials having anti-sticking properties.

2. A sealant-containing tire with an annular sealant chamber formed at an inner surface of a tread of a tire body, and with the inside of the sealant chamber being filled with sealant, wherein said sealant-containing tire comprises:

a first outer liner directly fastened to the inner surface of the tread of the tire body;

a second outer liner directly fastened to the inner surface of a side wall of the tire body; and an inner liner with left and right ends fastened to the inner surface of the second outer liner so that a sealant chamber is defined between a central part of the inner liner and the inner surface of the first outer liner, wherein the first outer liner and the inner liner are composed of materials having anti-sticking properties.

* * * * *